United States Patent
Jiang et al.

(10) Patent No.: US 10,899,037 B2
(45) Date of Patent: Jan. 26, 2021

(54) CONNECTING ROD ULTRASONIC-ASSISTED SPLITTING MACHINING METHOD AND MACHINING DEVICE THEREOF

(71) Applicant: Jiangsu University, Jiangsu (CN)

(72) Inventors: Yinfang Jiang, Jiangsu (CN); Deli Sha, Jiangsu (CN); Zhiqiang Kang, Jiangsu (CN); Kewei Wang, Jiangsu (CN); Wenfan Jiang, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 16/499,032

(22) PCT Filed: Oct. 30, 2017

(86) PCT No.: PCT/CN2017/108237
§ 371 (c)(1),
(2) Date: Sep. 27, 2019

(87) PCT Pub. No.: WO2018/176827
PCT Pub. Date: Oct. 4, 2018

(65) Prior Publication Data
US 2020/0031012 A1 Jan. 30, 2020

(30) Foreign Application Priority Data

Mar. 28, 2017 (CN) .......................... 2017 1 0192574

(51) Int. Cl.
*B26F 3/00* (2006.01)
*B21D 53/84* (2006.01)

(52) U.S. Cl.
CPC ................ *B26F 3/00* (2013.01); *B21D 53/84* (2013.01)

(58) Field of Classification Search
CPC .................................. B26F 3/00; B21D 53/84
See application file for complete search history.

(56) References Cited

U.S. PATENT DOCUMENTS

| 4,754,906 A | 7/1988 | Brovold |
| 4,768,694 A | 9/1988 | Fabris et al. |
(Continued)

FOREIGN PATENT DOCUMENTS

| CN | 2511428 Y | 9/2002 |
| CN | 101811251 A | 8/2010 |
(Continued)

OTHER PUBLICATIONS

International Search Report for PCT/CN2017/108237, dated Feb. 2, 2018, 4 pages.

*Primary Examiner* — Sean M Michalski
(74) *Attorney, Agent, or Firm* — Vincent J. Allen; Brandon V. Zuniga; Carstens & Cahoon, LLP (57) ABSTRACT

Connecting rod ultrasonic-assisted splitting machining method and a machining device thereof, relating to the field of machining of a connecting rod. The machining device comprises a rack, a fixing block, a sliding block, a sliding block base, a vertical locking oil cylinder, a wedge-shaped pull rod, an adjusting block body, etc. By means of the method and the device thereof, the range of the material used for splitting the connecting rod is enlarged, the splitting force required during the splitting of the connecting rod, deformation of fracture surfaces, residues generated during the splitting process, out-of-roundness of big end holes of the connecting rod, and other situations are reduced, and the engaging accuracy of the connecting rod and the joint face of a connecting rod cover and the assembly quality of the connecting rod are improved.

10 Claims, 2 Drawing Sheets

(56) References Cited

U.S. PATENT DOCUMENTS

| | | | | |
|---|---|---|---|---|
| 5,105,538 A * | 4/1992 | Hoag | ................ | B23D 31/003 29/888.09 |
| 5,169,046 A | 12/1992 | Miessen et al. | | |
| 6,671,955 B2 * | 1/2004 | Hugler | ................ | B22F 5/003 29/416 |
| 6,782,609 B1 * | 8/2004 | Beggs | ................ | B23D 31/003 225/100 |
| 8,069,567 B2 * | 12/2011 | Hansch | ................ | B23P 15/003 29/898 |
| 9,759,253 B2 * | 9/2017 | Prieto | ................ | B23D 31/002 |
| 9,821,387 B2 * | 11/2017 | Zubiaurre Lodoso | ................ | B23D 31/002 |
| 9,833,848 B2 * | 12/2017 | Hatayama | ................ | B23D 31/003 |
| 9,919,447 B2 * | 3/2018 | Hansmaier | ................ | F16C 9/045 |
| 2004/0129751 A1 * | 7/2004 | Piana | ................ | B23D 31/003 225/101 |
| 2005/0011925 A1 * | 1/2005 | Momose | ................ | B23D 31/003 225/1 |
| 2005/0044706 A1 * | 3/2005 | Momose | ................ | B23D 31/003 29/888.09 |
| 2008/0011801 A1 * | 1/2008 | Okumura | ................ | B23D 31/003 225/2 |
| 2009/0000111 A1 * | 1/2009 | Schneider | ................ | B65G 49/0459 29/791 |
| 2020/0031012 A1 * | 1/2020 | Jiang | ................ | B26F 3/00 |

FOREIGN PATENT DOCUMENTS

| | | |
|---|---|---|
| CN | 202701336 U | 1/2013 |
| CN | 105537999 A | 5/2016 |
| CN | 106944737 A | 7/2017 |
| JP | H11245122 A | 9/1999 |

\* cited by examiner

CONNECTING ROD ULTRASONIC-ASSISTED SPLITTING MACHINING METHOD AND MACHINING DEVICE THEREOF

This application is a US 371 Application from PCT/CN2017/108237 filed Oct. 30, 2017, which claims priority to Chinese Application No. 201710192574.7 filed Mar. 28, 2017, which are hereby incorporated herein by reference in their entirety.

TECHNICAL FIELD

The invention relates to the field of connecting rod processing, especially relates to the processing method and device for split of connecting rod assisted by ultrasonic vibration.

TECHNICAL BACKGROUND

The first step in traditional processing of connecting rod is to rough milling the forging blank. Then grinding the two sides of the connecting rod. Milling the cover and the main body. Machining the bolt holes on the cover and the rod separately. Grinding the joint surface of the cover and the main body of connecting rod separately. Finally, the connecting rod cover and the rod are assembled, and the two sides are finely ground, and the large and small head holes are fine. In the conventional process, the cutting of the rod and the cover and the grinding of the joint surface are less efficient. It has higher requirements on machining accuracy. After processing, the scrap rate and the cost are all very high. At present, there are few factories in the world that use traditional processing methods.

The splitting of the connecting rod utilizes the theory of material fracture. Firstly, the cracking grooves are processed on the big head hole of forged connecting rod to form stress concentration. Then the radial force is applied on the inner surface of the big head hole by the splitting processing equipment. Cracks will continue to propagate from the inside to the outside until the connecting rod is completely split. Finally, with the fracture surface fully engaged, add bolts and tighten to the required torque. The splitting process is a holistic process with only six processes. It has the advantages of simple processing method, less finishing equipment, energy saving of materials, and low production cost. The splitting process has been chosen by most of the world's connecting rod processing manufacturers due to its great superiority. However, it is difficult to control the deformation of the fracture surface and ensure the quality of the fracture surface during the splitting process of the connecting rod, which will cause the connecting rod to not engage completely after splitting. So far no good solution has been found, so the material of the splitting connecting rod is limited. And the conventional materials such as 40Cr can not be used for cracking.

Since the splitting technology of connecting rod came into being, Ford Corporation, MTS Company, ALFLING Company of Germany and many Japanese companies have developed the splitting equipment successively. For example, General Corporation of the United States used the "pneumatic pull-down" method to crack the connecting rod and applied for a patent. Its patent publication number is U.S. Pat. No. 4,768,694, and the patent publication date is Sep. 6, 1988. Ford Company in the United States uses a "horizontal" device to crack the large head hole of the connecting rod. Its patent publication number is U.S. Pat. No. 5,105,538A, and the patent publication date is Apr. 21, 1992. MTS Company in the United States uses "cracking block with hydraulic piston" for splitting processing. Its patent publication number is U.S. Pat. No. 4,754,906A, and the patent publication date is Jul. 5, 1988. ALFLING Company in Germany uses "horizontal force action form" equipment for splitting processing. Its patent publication number is U.S. Pat. No. 5,169,046, patent publication date is Dec. 8, 1992. A Japanese company has adopted the "eccentric shaft action mode" to crack the connecting rod. Its patent publication number is Kaiping 11-245122, and the patent publication date is Sep. 14, 1999. The main problem in the above production technology or patent technology is that after the splitting is completed, the deformation of the big head hole of the connecting rod is large, and the joint surface between the rod and the cover is deformed greatly. This will affect the meshing quality and assembly accuracy of the rod and cover, and it is impossible to crack the connecting rod made by conventional materials such as 40Cr.

Jilin University has independently researched and developed a directional splitting machine with "back pressure" cracking function for connecting rod. They applied for a patent, the patent publication number is CN2511428Y, and the patent publication date is Sep. 18, 2002. The directional splitting machine for the connecting rod uses a pull-down wedge-shaped cracking mechanism. The hydraulic cylinder drives the wedge rod to move linearly along the axial direction. The movement of the wedge rod forces the specially designed expansion and movement block to move horizontally, exerts a horizontal force on the big head hole of the connecting rod, and completes the rapid splitting process of the connecting rod under the action of the instantaneous load. But this method also has the above defects.

A patent's publication number is CN202701336U and its publication date is Jan. 30, 2013. The patent uses a brittle metal in the splitting region on a conventional material of connecting rod such as 40Cr to produce a composite bimetal splitting connecting rod. Thereby 40Cr steel can be used to manufacture splitting connecting rod. However, the bimetallic splitting connecting rod increases the manufacturing process difficulty of the composite metal and is difficult to apply to mass production. Moreover, the composite bimetallic connecting rod fails to solve the problems of deformation, slag, meshing quality and assembly precision which occur in the splitting process of other methods.

Some literatures have studied the crack propagation of alloys under vibration loading. It is found that under high-frequency vibration, the object with defects will rapidly form stress concentration at the notch and accelerate the fracture of the object at the notch. At the same time, high-frequency vibration can weaken the influence of the plastic zone and residual stress at the tip of the crack on crack propagation. However, the generation of cracks under high-frequency vibration, the control of vibration to crack propagation, and the meshing quality of fracture surfaces under vibration have not been described, and vibration has not been used for splitting of connecting rods.

Ultrasonic vibration is used for auxiliary machining during the splitting process of the connecting rod, which can effectively reduce the cracking force required for splitting of the connecting rod, reduce the deformation and the number of slag of the fracture surface during the splitting process. At the same time, the occurrence of offset of the break line, the deformation of the big head hole, the unilateral cracking and the crack bifurcation are reduced. Thus, the processing cost can be reduced, the positioning accuracy and assembly quality of body and cover can be improved, and the production efficiency and qualified rate of the splitting connecting rod can be improved.

SUMMARY OF THE INVENTION

According to the above problems, the present invention uses ultrasonic vibration to assist machining in the splitting process of the connecting rod. This method can effectively reduce the cracking force required for splitting of the connecting rod, reduce the deformation and the number of slag of the fracture surface during the splitting process. At the same time, the occurrence of offset of the break line, the deformation of the big head hole, the unilateral cracking and the crack bifurcation are reduced. Thus, the processing cost can be reduced, the positioning accuracy and assembly quality of body and cover can be improved, and the production efficiency and qualified rate of the splitting connecting rod can be improved.

Ultrasonic vibration is added to the splitting process of the connecting rod, and a stress wave is generated on the connecting rod, and the frequency of the wave is the frequency of the ultrasonic vibration. When the ultrasonic stress wave propagates on the connecting rod, the connecting rod is under the action of the alternating load. When the ultrasonic vibration is applied to the connecting rod, microscopically, the microcracks gradually grow under the action of the alternating load (ie, the action of the stress wave). At the same time, because the ultrasonic vibration wave is refracted and reflected on the crack surface, the closer to the crack tip, the more likely it is to impact or rub against each other, and the tip of the crack is more likely to break. The ultrasonic vibration wave is transmitted inside the connecting rod. When the ultrasonic stress wave passes through the crack, the vibration of the metal on both sides of the crack is inconsistent, and the two sides of the crack frequently contact and separate. When the ultrasonic waves pass through the tip of the crack, the cracks collide and slide to generate thermal energy, and the temperature of the tip of the crack increases, which helps to reduce the resistance during crack propagation. At the same time, from the perspective of microscopic dynamics, when the ultrasonic vibration wave acts on the crack, there is actually an inertial force acting on the tip of the crack, and the crack expands under the action of the alternating load. There is always an alternating force acting on the crack region, and each alternating change in force causes the crack to grow. Since the crack propagation and the reflection of the dislocations are always performed along the direction of the lattice slip, in the case of ultrasonic vibration assist, the splitting is easier and the cracking force is lower. The increase of the frequency and amplitude of ultrasonic vibration has a great influence on the crack propagation of the connecting rod. The increase of the frequency and amplitude of the ultrasonic vibration will cause the vibration frequency and vibration amplitude of the metal microparticles to increase microscopically. When the frequency and amplitude of the ultrasonic vibration increase, the kinetic energy of the particles of the connecting rod increases, which leads to an increase in the thermal energy and the fatigue load of the tip of the crack, causing fatigue fracture and thermal deformation at the tip of the crack. At the same time, the inertia force at the tip of the crack increases, which promotes the development of cracking and lattice dislocation at the tip of the crack. The crack will stop only when the kinetic energy at the tip of the crack is exhausted. Therefore, the increase of the amplitude and frequency of vibration accelerates the crack propagation.

Providing an ultrasonic vibration mechanism on a conventional splitting processing apparatus. By controlling the amplitude, frequency and vibration mode of the ultrasonic vibration, the cracking region of the connecting rod is placed in an environment of ultrasonic vibration. Moreover, a stress concentration phenomenon is rapidly formed in the cracking groove region to accelerate the breakage of the connecting rod. High-frequency vibration can weaken the influence of the plastic zone and residual stress at the tip of the crack on crack propagation. The crack propagation and the formation of the fracture are controlled by adjusting the amplitude, frequency and vibration mode of the ultrasonic vibration. The splitting separation is completed under the action of the force of the wedge rod and the ultrasonic vibration.

After the splitting separation of the connecting rod is completed, the cracking surface formed after the splitting separation is re-engaged. The amplitude, frequency and vibration mode of the ultrasonic vibration are readjusted so that the cracked sections are mutually agitated under vibrations of low amplitude and high frequency. So as to reduce the impact of the barbs, sharp edges and corners on the cracked section and the quality of the mesh. The cracking surface is brought to the required degree of conformity, the meshing precision of the joint surface of the rod and the cover is improved, and the assembly quality of the connecting rod is improved.

The processing method for splitting of connecting rod assisted by ultrasonic vibration is to provide an ultrasonic vibration mechanism on a conventional splitting processing apparatus. By controlling the amplitude, frequency and vibration mode of the ultrasonic vibration, the cracking region of the connecting rod is placed in an environment of ultrasonic vibration. So as to control the plastic zone and residual stress at the tip of the crack to improve the quality of the splitting. The cracking surface formed after the splitting separation is re-engaged. The amplitude, frequency and vibration mode of the ultrasonic vibration are readjusted so that the cracked sections are mutually agitated under vibrations of low amplitude and high frequency. Reduce the barbs and sharp edges on the cracked section, so that the cracking surface can reach the required degree of coincidence and improve the assembly quality of the splitting connecting rod. Including the following steps:

Step S1: Install the frame on the bench. Two symmetrical cracking grooves are machined inside the big head hole of the connecting rod to be split. Install the small hole of the connecting rod on the small hole positioning block. Install the big hole of the connecting rod on the cracking fixed ring and the cracking moving ring.

Step S2: Adjust the screw nut mechanism to drive the small head positioning block so that the small hole of the connecting rod has a certain pressing force. Adjust the horizontal pressure cylinder to drive the pressure block so that there is pressure at the big hole of the connecting rod. At the same time, the vertical locking cylinder is adjusted so that the pressing block remains stable after pressing. The pressing force on both sides of the connecting rod is about one-third to one-quarter of the cracking force.

Step S3: Adjust the amplitude, frequency, and vibration modes of the ultrasonic vibrations in the amplifier, transducer, and ultrasonic power system. Start the power supply of the ultrasonic equipment, so that the wedge rod vibrates in a certain amplitude, frequency and vibration mode.

Step S4: Turn on the splitting hydraulic cylinder, thus driving the wedge rod to move downward at a certain rate.

Turn off the ultrasonic power supply after the cracking fracture surface is formed at the big hole of the connecting rod.

Step S5: Readjust the amplitude, frequency and vibration mode of the ultrasonic vibration or use the original ultrasonic vibration parameters. Turn on the ultrasonic power supply and turn on the splitting hydraulic cylinder again, so that the wedge rod moves upward. Thus, the wedge rod is tightly combined with the splitting fixed ring and the splitting moving ring under ultrasonic vibration again. So that the two separated parts of big hole of the connecting rod are re-meshed, at this time, turn off the splitting hydraulic cylinder.

Step S6: According to the mark at the big hole of the connecting rod, a laser distance measuring device is used to detect the degree of coincidence of the cracking surface. So as to make the meshing accuracy meet the requirements of use. Then turn off the ultrasonic power supply. Set the torque and assemble the bolts. The splitting work is completed.

Further, the method of machining assisted with ultrasonic vibration can be replaced with other forms of vibration.

Further, the frequency of the ultrasonic generator could be adjusted from 15 kHz to 60 kHz when the connecting rod is split. The range of ultrasonic amplitude is from 100 microns to 200 microns. The ultrasonic vibration mode used in splitting process is axial or radial vibration. The direction of vibration is the same as that of the wedge rod.

Further, the relationship between the tension Q of the splitting hydraulic cylinder on the wedge rod and the cracking force N acting horizontally on the connecting rod is:

$$\frac{N}{Q} = \frac{\cos\alpha - \tan\varphi_2 \cdot \sin\alpha}{\sin\alpha + \tan\varphi_1 \cdot \cos\alpha - \tan\varphi_1 \cdot \tan\varphi_2 \cdot \sin\alpha + \tan\varphi_2 \cdot \cos\alpha}.$$

Among them: $\alpha$ is the wedge angle of the wedge block, $\varphi_1$ is the friction angle between the wedge rod and the fixed ring, $\varphi_2$ is the friction angle between the wedge rod and the moving ring.

Further, during the meshing process after the splitting of the connecting rod, the frequency adjustment range is 20 KHz-60 KHz. The ultrasonic amplitude ranges from 20 μm to 150 μm. The ultrasonic vibration mode used in splitting process is axial or radial vibration.

The machining device of processing method for splitting of connecting rod assisted by ultrasonic vibration includes small hole compaction mechanism, big hole splitting mechanism, connecting rod's cover compaction mechanism, slider mechanism, laser distance measuring system and ultrasonic vibration system. The ultrasonic vibration mechanism is set on a conventional splitting processing apparatus. By controlling the amplitude, frequency, and vibration modes of the ultrasonic vibration, the portion of the cracking region of the connecting rod is in an ultrasonic vibration state. It can control the micro-splitting morphology of materials and reduce the plastic deformation during splitting. Under the combined action of wedge rod and ultrasonic vibration, the split is completed, and then the frequency and amplitude of ultrasonic vibration are adjusted again, or the original ultrasonic vibration parameters are used to mesh the cracking surface under the condition of ultrasonic vibration, so that the cracking surface can meet the required coincidence.

In the small hole pressing mechanism of the connecting rod, the screw nut mechanism pushes the adjusting block to the right. The connecting rod is positioned and pressed by the small hole positioning block which is installed on the adjustment block. The detection system consists of the laser distance measuring device, splitting fixed ring and calibration on the splitting moving ring. This system can detect the coincidence of the cracking surface. The ultrasonic vibration mechanism includes amplifier, transducer and ultrasonic power supply. The amplifier and the wedge rod are connected by a stud. The amplifier is mounted on the guide and moves on the guide as the wedge rod moves up and down, causing vibration in the vertical direction during operation.

Further, the screw nut mechanism pushes the adjustment block to the right, so that the small hole positioning block presses the connecting rod.

Further, the ultrasonic vibration can be loaded on the back pressure device.

Further, the amplifier of the ultrasonic vibration device and the wedge rod are tightly connected by the stud. The wedge rod maintains vibration in the vertical direction during operation. And the ultrasonic vibration device moves on the guide as the wedge rod moves up and down.

Further, the pull-down wedge rod is connected to the splitting hydraulic cylinder through a vibration isolator.

Beneficial Effects

1. This processing method expands the range of materials used in the splitting connecting rod. This method can effectively reduce the cracking force required for splitting of the connecting rod, reduce the deformation and the number of slag of the fracture surface during the splitting process. At the same time, the deformation of the big hole is reduced. The meshing precision of the fracture surface is improved, and the assembly quality and assembly precision of the connecting rod are improved.

2. Ultrasonic vibration mechanism is set on a conventional splitting processing apparatus. By controlling the amplitude, frequency and vibration mode of the ultrasonic vibration, the cracking region of the connecting rod is placed in an environment of ultrasonic vibration. High-frequency vibration can weaken the influence of the plastic zone and residual stress at the tip of the crack on crack propagation. The crack propagation and the formation of the fracture are controlled by adjusting the amplitude, frequency and vibration mode of the ultrasonic vibration. This method can effectively reduce the cracking force required for splitting of the connecting rod, reduce the deformation and the number of slag of the fracture surface during the splitting process. At the same time, the deformation of the big hole is reduced. The splitting separation is completed under the action of the force of the wedge rod and the ultrasonic vibration.

3. After the splitting separation of the connecting rod is completed, the cracking surface formed after the splitting separation is re-engaged. The amplitude, frequency and vibration mode of the ultrasonic vibration are readjusted so that the cracked sections are mutually agitated under vibrations. The cracking surface is brought to the required degree of conformity, the meshing precision of the joint surface of the rod and the cover is improved, and the assembly quality of the connecting rod is improved.

4. The processing method and device for split of connecting rod assisted by ultrasonic vibration are adopted to expand the range of materials used in splitting connecting rods. Conventional materials such as 40Cr steel can be used for the split of connecting rod.

5. This method can effectively reduce the cracking force required for splitting of the connecting rod, reduce the deformation and the number of slag of the fracture surface during the splitting process. At the same time, the deformation of the big hole is reduced. Make the original conventional splitting process more perfect.

6. The cracked sections are mutually agitated under vibrations. The cracking surface is brought to the required degree of conformity, the meshing precision of the joint surface of the rod and the cover is improved, and the assembly quality of the connecting rod is improved.

7. By adjusting the amplitude, frequency and vibration mode of ultrasonic vibration, the splitting requirements of connecting rods with different materials and sizes can be met, and the processing cost can be effectively reduced, and the rejection rate can be reduced.

8. A vibration isolator is installed between the wedge rod and the splitting hydraulic cylinder, which can reduce the vibration transmitted by the wedge rod to the splitting hydraulic cylinder and improve the working stability of the splitting hydraulic cylinder.

1. splitting hydraulic cylinder; 2. rectangular connection block; 3. connecting bracket; 4. frame; 5. fixed block; 6. guide sleeve; 7. screw nut mechanism; 8. adjustment block; 9. small hole positioning block; 10. connecting rod; 11. splitting fixed ring; 12. wedge rod; 13. amplifier; 14. transducer; 15. ultrasonic power supply; 16. splitting moving ring; 17. cover of connecting rod; 18. the pressing block; 19. locating pin; 20. horizontal compression cylinder; 21. piston rod of horizontal cylinder; 22. slider; 23. connection block; 24. positioning screw; 25. connection plate; 26. back pressure cylinder; 27. hydraulic accumulator; 28. piston rod; 29. vertical locking cylinder; 30. slider support; 31. tick marks; 32. laser distance measuring device; 33. vertical locking hydraulic cylinder; 34. back pressure piston; 35. fixed platform; 36. guide.

Specific Implementation Method

Figure 1:
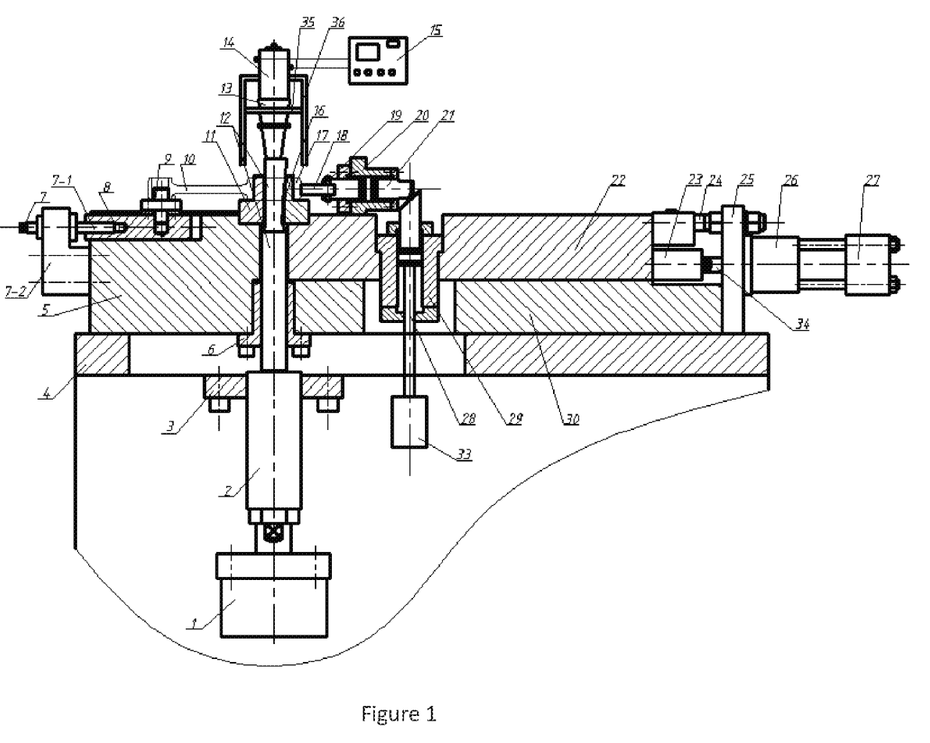
FIG. 1 is the main view of the device for split of connecting rod assisted by ultrasonic vibration.

In order to further understand the present invention, the drawings are further described:

FIG. 1 is the device for split of connecting rod assisted by ultrasonic vibration, including frame(4), fixed block(5), slider(22) and slider support(30). The frame(4) is fixed on the experimental platform, and the frame(4) is provided with holes. The fixed block(5) and the slider support(30) are both mounted on the frame(4). The slider(22) is mounted on the slider support(30). The corresponding position of the slider(22) and the slider support(30) has a vertical stepped hole B, and the vertical locking cylinder(29) is installed in the vertical stepped hole B. A vertical stepped hole A is arranged at the joint of fixed block(5), slider support(30) and slider(22), and the wedge rod(12) is installed in the vertical stepped hole A. The rectangular connection block(2) is installed at the lower end of the wedge rod(12). The rectangular connection block(2) is connected with the splitting hydraulic cylinder(1). The splitting fixed ring(11) and the splitting moving ring(16) are installed at the upper end of the vertical stepped hole A. A inverted T-shaped hole is composed of the splitting fixed ring(11) and the splitting moving ring(16). The wedge rod(12) passes through the inverted T-shaped hole. The upper end of the fixed block(5) is provided with a concave pit, and the adjustment block(8) is arranged in the concave pit. Screw nut mechanism(7) is set on the side of the adjustment block(8). The screw nut mechanism(7) comprises a screw nut(7-1) and a screw nut support(7-2). The screw nut support(7-2) is fixed on the side wall of the fixed block(5). The screw nut(7-1) is mounted on the screw nut support(7-2) and matches with the adjustment block(8). The small hole positioning block(9) is installed on the upper end of the adjustment block(8). The upper end of the wedge rod(12) is connected with the amplifier(13). The upper end of the amplifier(13) is connected with the transducer(14). The amplifier(13) is mounted on the guide(36) by means of the fixed platform(35). The transducer(14) is connected to ultrasonic power supply(15). The pressing block(18) is arranged on the right side of splitting moving ring(16). The pressing block(18) is connected to the piston rod of horizontal cylinder(21) through the locating pin(19). Piston rod of horizontal cylinder(21) is installed in horizontal compression cylinder(20). The other end of the piston rod of horizontal cylinder(21) is in vertical contact with the vertical piston rod(28). Piston rod(28) is installed in vertical locking cylinder(29). Piston rod(28) is connected with vertical locking hydraulic cylinder(33). Connection block(23) and positioning screw(24) are arranged on the vertical surface of the end of the slider(22) away from the fixed block(5). The other end of the connection block(23) and the positioning screw(24) are both arranged on the connection plate(25). Connection plate(25) is placed on frame(4). Connection block(23) is connected with back pressure cylinder(26) through back pressure piston(34). Back pressure cylinder(26) is connected with hydraulic accumulator(27). The mating portion of the wedge rod(12) and the splitting fixed ring(11) is cylindrical, and the mating portion of the wedge rod(12) and the splitting moving ring(16) is tapered. A guide sleeve(6) is mounted on the wedge rod(12). The guide sleeve(6) is fixed to the lower end of the fixed block(5) and the slider support(30). The lower end of the frame(4) has the connecting bracket(3). A hole is formed in the connecting bracket(3), and the hole is matched with the rectangular connection block(2). The screw nut support(7-2) is L-shaped. The wedge rod(12) and the rectangular connection block(2) are connected by threads. In order to prevent the rotation of the piston rod and the wedge rod(12) in the splitting hydraulic cylinder(1), the piston rod in the splitting hydraulic cylinder(1) and the rectangular connection block(2) are connected and locked by the nut. A rectangular groove is formed on the top panel of the connecting bracket(3). And the left and right sides of the groove are maintained in a tolerance relationship with the rectangular connection block(2). The wedge rod(12) is guided by the guide sleeve(6) during the downward movement.

In the splitting process of connecting rod, "back pressure" splitting method is adopted. Before split, put the small hole of connecting rod(10) on the small hole positioning block(9). Place the big hole of connecting rod(10) on the splitting fixed ring(11) and the splitting moving ring(16). The adjusting block(8) is pushed to the right by the screw nut mechanism(7), so that the small hole positioning block(9) which is installed on the adjustment block(8) can position and tighten the connecting rod(10). The pressing block(18) is connected to the end of the piston rod of the horizontal compression cylinder(20), and the pressing block(18) presses the big hole of the connecting rod(10). After the horizontal cylinder(20) drives the pressing block(18) to press the connecting rod(10), the vertical locking cylinder(29) works immediately. The locking piston rod(28) having a inclined plane and presses the horizontal piston rod(21), so that the fracture surface of the connecting rod's(10) big hole is in the state of pre-compression.

At this time, the slider(22) with the horizontal compression cylinder(20) and vertical locking cylinder(29) has been driven by the back pressure cylinder(26) and pressed on the fixed block(5). Adjust the amplitude, frequency, vibration mode and direction of ultrasonic vibration, and turn on the ultrasonic vibration device. The splitting hydraulic cylinder 1 operates and drives the wedge rod(12) to move downward. The amplifier(13) moves downward with the wedge rod(12) and produces vertical vibration during the movement. The wedge rod(12) is connected with the amplifier(13) through the stud. Amplifier(13) is mounted on guide(36) by means of the fixed platform(35). The amplifier(13) moves on the guide(36) as the wedge rod(12) moves up and down. Then the wedge rod(12) converts the downward force into a horizontal force, thereby promoting the splitting moving ring(16). Under the horizontal force of the splitting moving ring(16), the cracks will propagate rapidly along the cracking grooves which is pre-processed in the connecting rod's (10) big hole, so that the connecting rod's(10) big hole is broken and separated. During the downward movement of the wedge rod(12), the slider(22) will also move to the right. As the slider(22) moves to the right, the back pressure piston(34) of the back pressure cylinder(26) will compress the hydraulic oil in the back chamber. At this time, the reversing valve of the back pressure cylinder(26) does not change the direction, so that a small amount of high pressure hydraulic oil flows to the hydraulic accumulator(27). In this way, the connecting rod's cover is also in the state of back pressure in the splitting process, and the better fracture surface can be obtained.

Adjust the amplitude, frequency and vibration modes of ultrasonic vibration, and turn on the ultrasonic vibration device. With the downward force of the wedge rod(12), the splitting part of the connecting rod achieves rapid fracture. When the connecting rod is broken, the cover will be separated from the body, and the cover will have a certain amount of displacement. In order to maintain the back pressure required for splitting, back pressure cylinder(26) is used. The rear chamber of the back pressure cylinder(26) is connected to the hydraulic accumulator(27). When the cover displaces, the hydraulic oil of the back pressure cylinder(26) is discharged into the accumulator(27), which ensures that the connecting rod's cover is always subjected to back pressure during the splitting process. The fracture surface with good meshing property can be obtained by using the fracture mode of "back pressure". It reduces the tearing phenomenon of fracture and the amount of dropping slag. Thus, the aim of improving the splitting quality of connecting rod is achieved.

Figure 2:
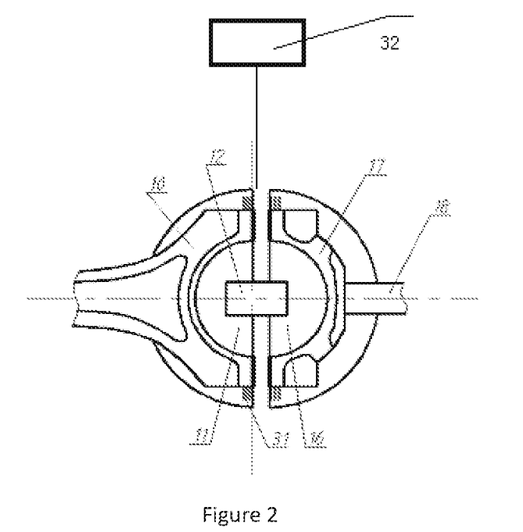
FIG. 2 is a schematic diagram of the big hole of the connecting rod after splitting.
Figure 3:
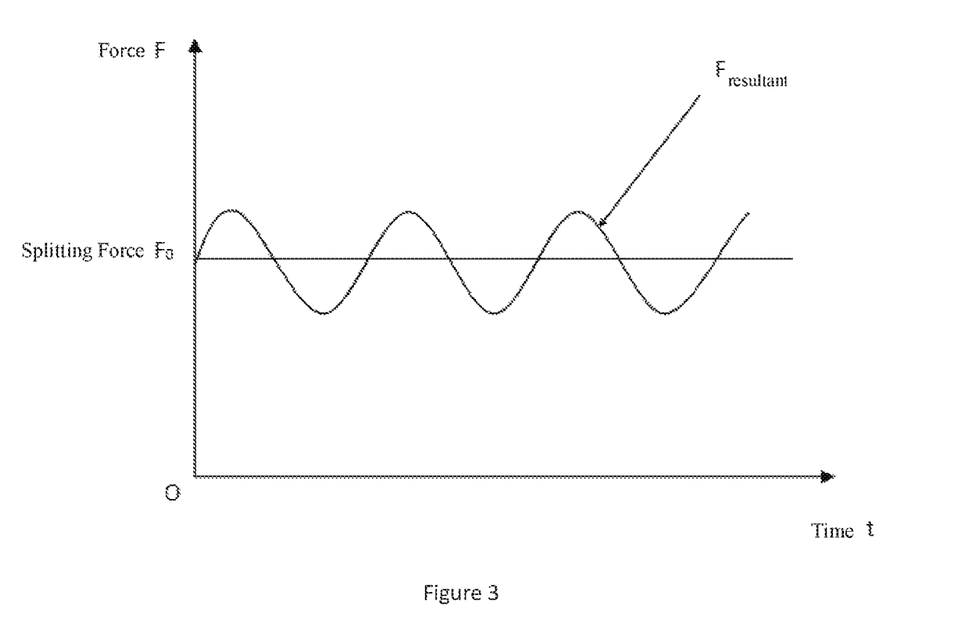
FIG. 3 is a schematic diagram of the combined forces of splitting force and ultrasonic vibration.

See FIG. 2 and FIG. 3, turn off the ultrasonic power supply(15). Readjust the amplitude, frequency and vibration mode of the ultrasonic vibration or use the original vibration parameters. Turn on the ultrasonic vibration device, then the splitting hydraulic cylinder(1) drives the wedge rod(12) to start resetting. Back pressure cylinder(26) drives the slider (22) to move forward, so as to merge splitting moving ring(16) with splitting fixed ring(11). The separated cover of connecting rod(17) meshes closely with the connecting rod(10). The coincidence of the cracking surface is detected by using the laser detection system, the splitting moving ring(16) and the mark on the splitting fixed ring(11). So as to make the meshing accuracy meet the requirements of use. Then turn off the ultrasound power.

The processing method of machining device for split of connecting rod assisted by ultrasonic vibration, including the following steps:

Step S1: Install the chassis(4) on the bench. Two symmetrical cracking grooves are machined inside the big head hole of the connecting rod(10) to be split. Install the small hole of the connecting rod(10) on the small hole positioning block(9). Install the large hole of the connecting rod(10) on the cracking fixed ring(11) and the cracking moving ring (16).

Step S2: Adjust the screw nut mechanism(7) to drive the small hole positioning block(9) so that the small head hole of the connecting rod(10) has a certain pressing force. Adjust the horizontal pressure cylinder(20) to drive the pressure block(18) so that there is pressure at the big head hole of the connecting rod(10). At the same time, the vertical locking cylinder(20) is adjusted so that the pressing block(18) remains stable after pressing. The pressing force on both sides of the connecting rod is about one-third to one-quarter of the cracking force.

Step S3: Adjust the amplitude, frequency, and vibration modes of the ultrasonic vibrations in the amplifier(13), transducer(14), and ultrasonic power supply(15) system. The range of ultrasonic frequency is from 15 kHz to 60 kHz. The range of ultrasonic amplitude is from 100 microns to 200 microns. The ultrasonic vibration mode used in splitting process is axial or radial vibration. Start the ultrasonic power supply(15), so that the wedge rod(12) vibrates in a certain amplitude, frequency and vibration mode.

Step S4: Turn on the splitting hydraulic cylinder(1), thus driving the wedge rod(12) to move downward at a certain rate. Turn off the ultrasonic power supply(15) after the cracking fracture surface is formed at the big hole of the connecting rod(10). The relationship between the tension Q of the splitting hydraulic cylinder on the wedge rod and the cracking force N acting horizontally on the connecting rod is:

$$\frac{N}{Q} = \frac{\cos\alpha - \tan\varphi_2 \cdot \sin\alpha}{\sin\alpha + \tan\varphi_1 \cdot \cos\alpha - \tan\varphi_1 \cdot \tan\varphi_2 \cdot \sin\alpha + \tan\varphi_2 \cdot \cos\alpha}.$$

Among them: $\alpha$ is the wedge angle of the wedge block, $\varphi_1$ is the friction angle between the wedge rod and the fixed ring, $\varphi_2$ is the friction angle between the wedge rod and the moving ring.

Step S5: Mesh the connecting rod after split. Readjust the amplitude, frequency or or use the original ultrasonic vibration parameters. The adjustment range of frequency is 20 KHz-60 KHz. The ultrasonic amplitude ranges from 20 μm to 150 μm. The ultrasonic vibration mode used in splitting process is axial or radial vibration. Turn on the ultrasonic power supply(15) and the splitting hydraulic cylinder(1) again, so that the wedge rod(12) moves upward. Thus, the wedge rod(12) is tightly combined with the splitting fixed ring(11) and the splitting moving ring(16) under ultrasonic vibration again. So that the two separated parts of big hole of the connecting rod(10) are re-meshed, at this time, turn off the splitting hydraulic cylinder(1).

Step S6: According to the mark(31) at the big hole of the connecting rod(10), a laser distance measuring device(32) is used to detect the degree of coincidence of the cracking surface. So as to make the meshing accuracy meet the requirements of use. Then turn off the ultrasound power supply(15). Set the torque and assemble the bolts. The splitting work is completed.

The above is the preferred implementation of the invention, but the invention is not limited to the above implementation. Without departing from the substance of the invention, any obvious improvement, replacement or variant that a technician in this field can make belongs to the scope of protection of the present invention.

What is claimed is:

1. The processing method for splitting of connecting rod, providing an ultrasonic vibration mechanism on the conventional splitting processing device; by controlling the amplitude, frequency and vibration mode of the ultrasonic vibration, the cracking region of the connecting rod is placed in an environment of ultrasonic vibration; so as to control the plastic zone and residual stress at the tip of the crack to improve the quality of the splitting; the cracking surface formed after the splitting separation is re-engaged; the amplitude, frequency and vibration mode of the ultrasonic vibration are readjusted so that the cracked sections are mutually agitated under vibrations of low amplitude and high frequency; reduce the barbs and sharp edges on the cracked section, so that the cracking surface can reach the required degree of coincidence and improve the assembly quality of the splitting connecting rod, including the following steps:

Step S1: install the frame on the bench; two symmetrical cracking grooves are machined inside the big head hole of the connecting rod to be split; install the small hole of the connecting rod on the small hole positioning block; install the big hole of the connecting rod on the cracking fixed ring and the cracking moving ring;

Step S2: adjust the screw nut mechanism to drive the small head positioning block so that the small hole of the connecting rod has a certain pressing force; adjust the horizontal pressure cylinder to drive the pressure block so that there is pressure at the big hole of the connecting rod; at the same time, the vertical locking cylinder is adjusted so that the pressing block remains stable after pressing; the pressing force on both sides of the connecting rod is about one-third to one-quarter of the cracking force;

Step S3: adjust the amplitude, frequency, and vibration modes of the ultrasonic vibrations in the amplifier, transducer, and ultrasonic power system; start the power supply of the ultrasonic equipment, so that the wedge rod vibrates in a certain amplitude, frequency and vibration mode;

Step S4: turn on the splitting hydraulic cylinder, thus driving the wedge rod to move downward at a certain rate; turn off the ultrasonic power supply after the cracking fracture surface is formed at the big hole of the connecting rod;

Step S5: readjust the amplitude, frequency and vibration mode of the ultrasonic vibration or use the original ultrasonic vibration parameters; turn on the ultrasonic power supply and turn on the splitting hydraulic cylinder again, so that the wedge rod moves upward; thus, the wedge rod is tightly combined with the splitting fixed ring and the splitting moving ring under ultrasonic vibration again; so that the two separated parts of big hole of the connecting rod are re-meshed, at this time, turn off the splitting hydraulic cylinder; and Step S6: according to the mark at the big hole of the connecting rod, a laser distance measuring device is used to detect the degree of coincidence of the cracking surface; so as to make the meshing accuracy meet the requirements of use; then turn off the ultrasonic power supply; set the torque and assemble the bolts, the splitting work is completed.

2. The processing method for splitting of connecting rod according to claim 1, wherein, the method of machining assisted with ultrasonic vibration can be replaced with other forms of vibration.

3. The processing method for splitting of connecting rod according to claim 1, wherein, the frequency of the ultrasonic generator could be adjusted from 15 kHz to 60 kHz when the connecting rod is split; the range of ultrasonic amplitude is from 100 microns to 200 microns; the ultrasonic vibration mode used in splitting process is axial or radial vibration; the direction of vibration is the same as that of the wedge rod.

4. The processing method for splitting of connecting rod according to claim 1, wherein, the relationship between the tension Q of the splitting hydraulic cylinder on the wedge rod and the cracking force N acting horizontally on the connecting rod is:

$$\frac{N}{Q} = \frac{\cos\alpha - \tan\varphi_2 \cdot \sin\alpha}{\sin\alpha + \tan\varphi_1 \cdot \cos\alpha - \tan\varphi_1 \cdot \tan\varphi_2 \cdot \sin\alpha + \tan\varphi_2 \cdot \cos\alpha};$$

among them: $\alpha$ is the wedge angle of the wedge block, $\varphi_1$ is the friction angle between the wedge rod and the fixed ring, $\varphi_2$ is the friction angle between the wedge rod and the moving ring.

5. The processing method for splitting of connecting rod according to claim 1, wherein, during the meshing process after the splitting of the connecting rod, the frequency adjustment range is 20 KHz-60 KHz; the ultrasonic amplitude ranges from 20 μm to 150 μm; the ultrasonic vibration mode used in splitting process is axial or radial vibration.

6. The machining device based on the processing method for split of connecting rod assisted by ultrasonic vibration according to claim 1, wherein, the device consists of small hole compaction mechanism, big hole splitting mechanism, connecting rod's cover compaction mechanism, slider mechanism, laser distance measuring system and ultrasonic vibration system; the ultrasonic vibration mechanism is set on a conventional splitting processing apparatus; by controlling the amplitude, frequency, and vibration modes of the ultrasonic vibration, the portion of the cracking region of the connecting rod is in an ultrasonic vibration state; it can control the micro-splitting morphology of materials and reduce the plastic deformation during splitting; under the combined action of wedge rod and ultrasonic vibration, the split is completed, and then the frequency and amplitude of ultrasonic vibration are adjusted again, or the original ultrasonic vibration parameters are used to mesh the cracking surface under the condition of ultrasonic vibration, so that the cracking surface can meet the required coincidence;

in the small hole pressing mechanism of the connecting rod, the screw nut mechanism pushes the adjusting block to the right; the connecting rod is positioned and pressed by the small hole positioning block which is installed on the adjustment block; the detection system consists of the laser distance measuring device, splitting fixed ring and calibration on the splitting moving ring; this system can detect the coincidence of the cracking surface; the ultrasonic vibration mechanism includes amplifier, transducer and ultrasonic power supply; the amplifier and the wedge rod are connected by a stud; the amplifier is mounted on the guide and moves on the guide as the wedge rod moves up and down, causing vibration in the vertical direction during operation.

7. The machining device for split of connecting rod assisted by ultrasonic vibration according to claim 6, wherein, the screw nut mechanism pushes the adjustment block to the right, so that the small hole positioning block presses the connecting rod.

8. The machining device for split of connecting rod assisted by ultrasonic vibration according to claim 6, wherein, the ultrasonic vibration can be loaded on the back pressure device.

9. The machining device for split of connecting rod assisted by ultrasonic vibration according to claim 6, wherein, the amplifier of the ultrasonic vibration device and the wedge rod are tightly connected by the stud; the wedge rod maintains vibration in the vertical direction during operation; and the ultrasonic vibration device moves on the guide as the wedge rod moves up and down.

10. The machining device for split of connecting rod assisted by ultrasonic vibration according to claim 6, wherein, the pull-down wedge rod is connected to the splitting hydraulic cylinder through a vibration isolator.

\* \* \* \* \*